US007941428B2

(12) United States Patent
Huston

(10) Patent No.: US 7,941,428 B2
(45) Date of Patent: May 10, 2011

(54) METHOD FOR ENHANCING SEARCH RESULTS

(76) Inventor: Jan W. Huston, Honolulu, HI (US)

( * ) Notice: Subject to any disclaimer, the term of this patent is extended or adjusted under 35 U.S.C. 154(b) by 367 days.

(21) Appl. No.: 11/763,520

(22) Filed: Jun. 15, 2007

(65) Prior Publication Data

US 2008/0313144 A1 Dec. 18, 2008

(51) Int. Cl.
G06F 17/30 (2006.01)
(52) U.S. Cl. ........ 707/722; 707/706; 707/707; 707/723; 707/737; 707/748; 707/749; 707/750; 707/751; 707/752
(58) Field of Classification Search .......... 707/706–707, 707/722–723, 737, 748–752
See application file for complete search history.

(56) References Cited

U.S. PATENT DOCUMENTS

| 6,073,130 | A | 6/2000 | Jacobson et al. | |
|---|---|---|---|---|
| 6,185,558 | B1 | 2/2001 | Bowman et al. | |
| 6,282,548 | B1 | 8/2001 | Burner | |
| 6,314,420 | B1 | 11/2001 | Lang | |
| 6,604,131 | B1 * | 8/2003 | Warris et al. | 709/205 |
| 7,016,889 | B2 | 3/2006 | Bazoon | |
| 7,058,516 | B2 | 6/2006 | Mascarenhas | |
| 7,072,888 | B1 | 7/2006 | Perkins | |
| 7,143,089 | B2 | 11/2006 | Petras | |
| 7,228,305 | B1 | 6/2007 | Eyal et al. | |
| 7,822,742 | B2 * | 10/2010 | Majumder et al. | 707/722 |
| 2002/0046203 | A1 * | 4/2002 | Siegel et al. | 707/1 |
| 2003/0033298 | A1 * | 2/2003 | Sundaresan | 707/5 |
| 2003/0033299 | A1 * | 2/2003 | Sundaresan | 707/5 |
| 2003/0225756 | A1 | 12/2003 | Lui | |
| 2004/0002945 | A1 * | 1/2004 | Shibata | 707/1 |
| 2004/0143644 | A1 * | 7/2004 | Berton et al. | 709/217 |
| 2005/0216457 | A1 * | 9/2005 | Walther et al. | 707/4 |
| 2005/0234877 | A1 * | 10/2005 | Yu | 707/3 |
| 2006/0031214 | A1 * | 2/2006 | Solaro et al. | 707/4 |
| 2006/0095404 | A1 * | 5/2006 | Adelman et al. | 707/3 |
| 2006/0282416 | A1 * | 12/2006 | Gross et al. | 707/3 |
| 2007/0005564 | A1 * | 1/2007 | Zehner | 707/2 |
| 2007/0064626 | A1 * | 3/2007 | Evans | 370/254 |
| 2007/0118521 | A1 * | 5/2007 | Jatowt et al. | 707/5 |
| 2007/0185827 | A1 * | 8/2007 | Mrzyglocki | 707/1 |
| 2007/0239702 | A1 * | 10/2007 | Vassilvitskii et al. | 707/5 |
| 2008/0168055 | A1 * | 7/2008 | Rinearson et al. | 707/5 |

(Continued)

OTHER PUBLICATIONS

International Searching Authority, International Search Report and Written Opinion in PCT No. PCT/US2008/066129, Mailed Sep. 30, 2008.

Primary Examiner — Frantz Coby
(74) Attorney, Agent, or Firm — Hiscock & Barclay, LLP

(57) ABSTRACT

Disclosed in this specification is a software and browser application for monitoring submissions to a third-party search engine. When the third-party search engine returns a list of results, the list may be compared to a list of rated websites located in a rating database. For each website in the list of rated websites, one or more experts has entered a rating value and text evaluation. The rating value for each of the websites in the list of results is then displayed to the user upon request. Additionally, metadata may also be displayed for each of the websites. In this manner, the list of results that was provided by the third-party search engine has been enhanced so as to permit the user to more easily find reliable, relevant information.

22 Claims, 14 Drawing Sheets

U.S. PATENT DOCUMENTS

2008/0222106 A1* 9/2008 Rao et al. .................... 707/3
2008/0270389 A1* 10/2008 Jones et al. ................. 707/5
2008/0301112 A1* 12/2008 Wu .............................. 707/5
2009/0171746 A1* 7/2009 Lee et al. ..................... 705/10
2010/0299317 A1* 11/2010 Uy ............................... 707/706
2010/0299692 A1* 11/2010 Rao et al. .................... 725/14

* cited by examiner

METHOD FOR ENHANCING SEARCH RESULTS

FIELD OF THE INVENTION

This invention relates, in one embodiment, to a method for enhancing internet search results. The method may be executed by a software application which is integrated with a web-browser. In one embodiment, the software application is a toolbar. When the web-browser is directed to a third-party search engine and a search term is submitted thereto, the software application monitors the list of results that are received from the search engine. The list of results is compared to a list of rated websites in a rating database, The rating value of each of the websites which are so rated may then be displayed to the submitter. Importantly, the list of rated websites is constructed by one or more humans who, in one embodiment, are experts in their respective fields.

BACKGROUND OF THE INVENTION

Current internet search engines suffer from a number of deficiencies. To conduct a search on the internet, a user must submit a search term to a search engine web site. In response to such a submission, the search engine performs a query of its local "metadata" database to see if any of the websites that are indexed by the search engine satisfy the search term. Often, the search engine performs a complex calculation that attempts to order the list of results according to a computer algorithm. For example, many search engines order a list of results based on the popularity of the located websites. Thus, more popular websites receive favoritism. This favoritism may be reflected in the resulting placement. Other factors may be included when determining the placement, but such ordering is typically calculated in real-time by computerized algorithms.

Unfortunately, these algorithms, and the resulting favoritism, have been written in such a manner that it is often difficult for a user to quickly and accurately locate the most reliable and relevant information. Often, the computerized algorithms are constructed so as to provide a higher order value to a website that has paid for special treatment. For example, if a user wanted to learn about the scientific principles that govern the formation of diamonds, the user may submit the search term "diamonds" to a search engine. Most of the resulting websites likely pertain to diamond retailers, and do not pertain to the information that was truly desired by the user. Moreover, the submitter cannot be certain that the resulting websites will report reliable information because no independent verification of the website content has been performed.

Therefore, a method to enhance the search results of a search engine is desired so that a user might more easily locate reliable, relevant information.

SUMMARY OF THE INVENTION

The invention comprises, in one embodiment thereof, an application for monitoring submissions to a third-party search engine. When the third-party search engine returns a list of results, the list may be compared to a list of rated websites located in a rating database. For each website in the list of rated websites, one or more persons has entered one or more rating values. These rating values are used to calculate a compilation rating value. The compilation rating value for each of the websites in the list of results is then displayed to the user. When more than one website is displayed to the user, the compilation rating value is used to determine the order value of the website. The order value refers to the position a website occupies in a list of multiple websites.

An advantage of the present invention is that the user may quickly determine which of the results pertain to the reliable information, and which results are merely commercial advertisements, are off-topic, or provide unreliable information.

BRIEF DESCRIPTION OF THE DRAWINGS

The present invention is disclosed with reference to the accompanying drawings, wherein.

Corresponding reference characters indicate corresponding parts throughout the several views. The examples set out herein illustrate several embodiments of the invention but should not be construed as limiting the scope and spirit of the invention in any manner.

DETAILED DESCRIPTION OF A PREFERRED EMBODIMENT

Figure 1:
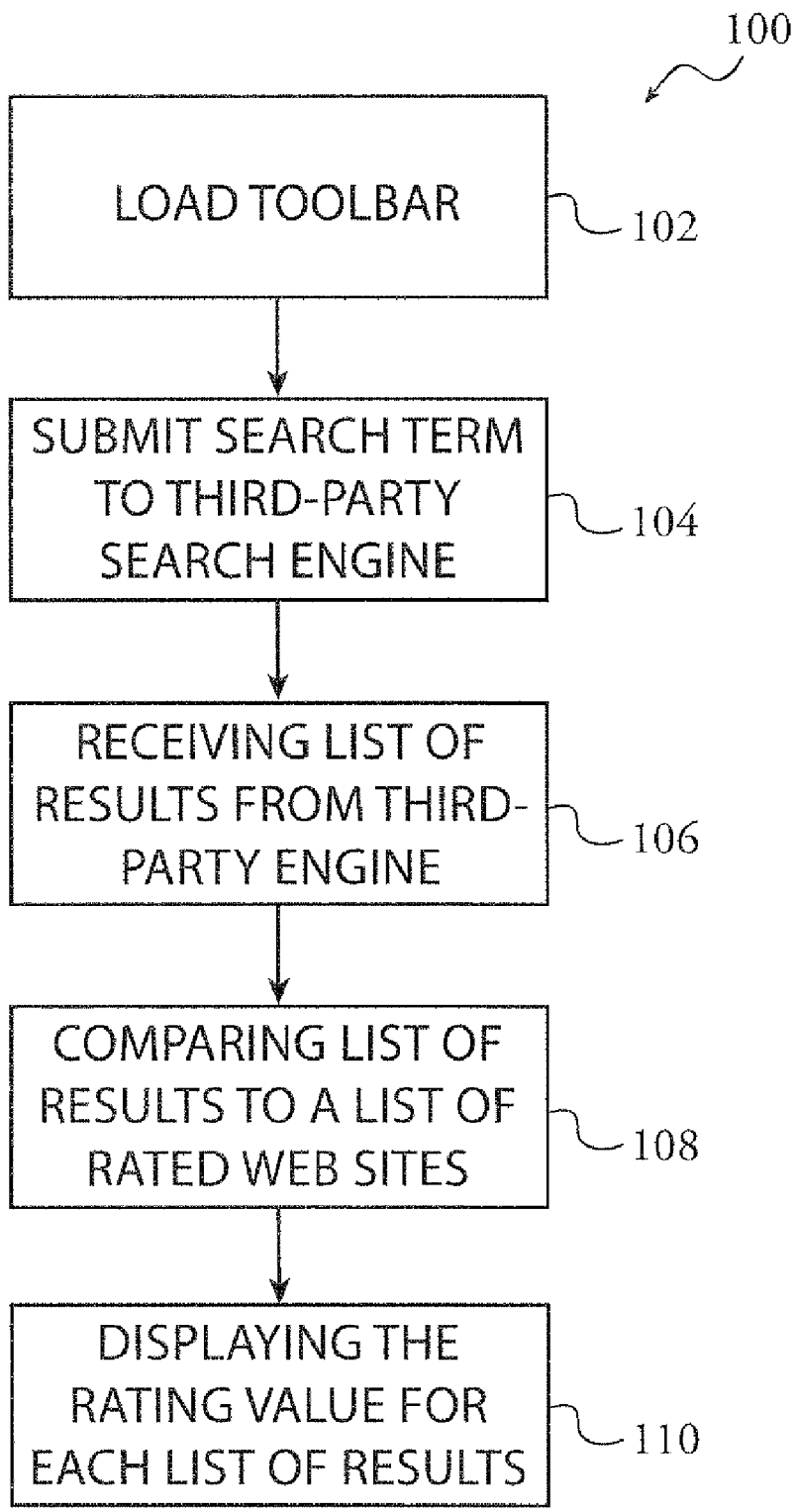
FIG. 1 is a flow diagram of one method of the invention.
Figure 2:
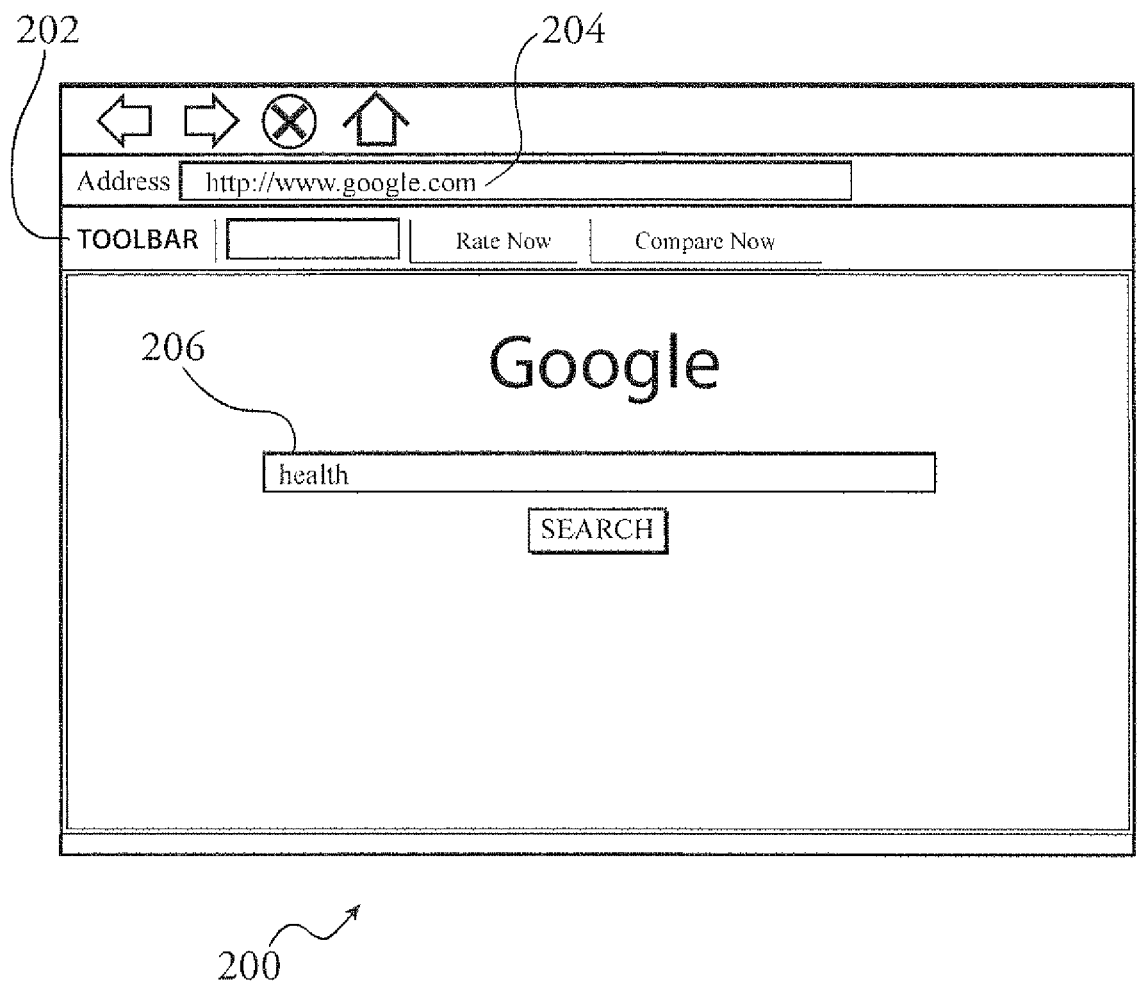
FIG. 2 is a depiction of one browser and toolbar for use with the present invention.

Referring to FIG. 1, method 100 is shown wherein the method enhances the search results of a third-party search engine. Method 100 is initiated by executing step 102, wherein a toolbar is loaded and integrated with a web browser. For example, the toolbar is configured to load into the computer's memory with the loading of the web-browser to which it is integrated. Reference may be had to FIG. 2.

FIG. 2 is a depiction of web browser 200 which includes toolbar 202. Web browser 200 has been pointed to the Uniform Resource Locator (URL) of third-party search engine 204. As used in this specification, the term "third-party search engine" refers to a search engine that is operated by an entity other than the submitter of the search term and other than the operator of the rating database. In one embodiment, the search engine is hosted on a first server and the rating database is hosted on a second server. The first and second server communicate with one another only over the internet and not over a local network. In the example depicted in FIG. 2, the third-party search engine 204 is Google®. Other third-party search engines may also be used, such as Yahoo®, MSN®, or other suitable engines. The third-party search engine need not be an internet search engine. In some embodiments, the search engine searches a local area network (LAN) or only searches within a given domain. For example, the website www.XYZ.com may contain, within the site itself, a search engine that searches only within the XYZ.com domain. Likewise, web-browser 200 may be any suitable web-browser. In the example of FIG. 2, Internet Explorer® is used. Other suitable web-browsers include Netscape®, FireFox®, Opera®, and Safari®. As shown in FIG. 2, search term 206 is being submitted to the third-party search engine 204. In the instant example, search term 206 is "health." It should be understood that the phrase "search term" refers both to single words/character strings, as well as combinations of words and character strings.

Referring again to FIG. 1, once the toolbar has been loaded in step 102, search term 206 (see FIG. 2) is submitted to third-party search engine 204 in step 104 of method 100. As would be apparent to one skilled in the art of search engines, such engines typically index websites and correlate certain website metadata to the website URL. When a search term, such as search term 206, is submitted to the engine then the engine queries its indexed metadata for matches. Metadata refers to data about data. For example, the indexed metadata database used by search engines contains keywords pertaining to the websites it indexes. The search engine typically does not search through the text of the websites. Examples of other types of metadata include textual descriptions of the websites, topic categories of websites and the like. Those URLs which match the search term (i.e. the list of results 300, see FIG. 3) are then displayed to the user in an order that is dictated by a predetermined algorithm. In step 106 of FIG. 1, this list of results is received by the web-browser 200.

Figure 3:
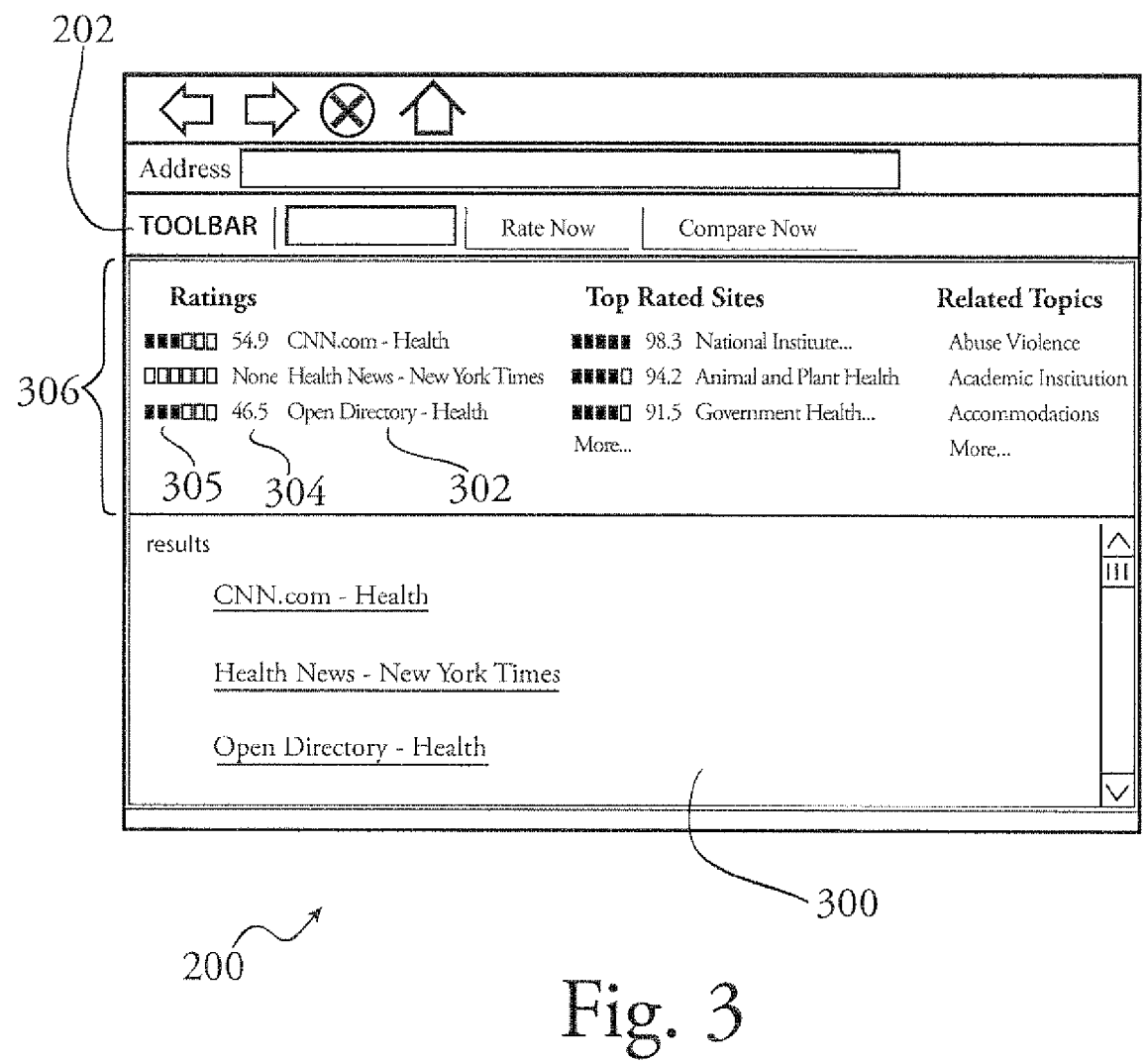
FIG. 3 is a illustration of an expanded toolbar.

In step 106 of method 100, the list of search results from the third-party search engine is received by web-browser 200. The toolbar application 202 monitors the communication between browser 200 and search engine 204 and detects both the submitted search term 206, and the received list of results 300 (see FIG. 3). Search engines typically generate temporary files on the submitter's local computer—either stored in the computer's transient memory or stored as files on the hard drive. In one embodiment, these temporary files are monitored for communication between browser 200 and search engine 204. As shown in FIG. 3, browser 200 displays the list of results 300. The length of the list of search results is typically determined by the third-party search engine. For example, if the search engine locates 100 "hits" and is set to only display 10 "hits" per screen/page, then the first list of results is 10 hits long (hits 1-10). The user may select the next page of the search results and display results 11-20. In this manner a second list of results (containing results 11-20) is generated. Advantageously, the toolbar will, in certain embodiments, determine the identity of the third-party search engine and load one or more corresponding communication protocols which permit the toolbar application to properly interpret the communication between the browser 200 and the search engine 204. For example, certain search engines may store their temporary files in a specific format on the submitter's computer. Such communication protocols permit the toolbar to properly read this format. In this manner, a single toolbar application can enhance the search results of more than one third-party search engine by accessing a plurality of communication protocols. In one embodiment, the toolbar searches the currently selected browser window for recognizable URL addresses, and does not necessarily monitor a third-party "search engine". For example, the www.XYZ.com website may contain a list of hyperlinks to external websites. Upon request, toolbar 202 can query a rating database to determine the rating value for each of the websites listed on such a list of hyperlinks.

Referring again to FIG. 1, in step 108 of method 100, the list of results 300 (see FIG. 3) is compared to a list of rated websites. This list of rated websites may be stored, for example, in a rating database. This rating database correlates a certain website domain (or a specific URL within a domain) with a compilation rating value. The compilation rating value is established based upon a human-assigned rating values that correspond to certain criteria. The details of such a rating system is discussed elsewhere in this specification, In step 110 of method 100, the rating value that is assigned by an expert is displayed within expanded toolbar 306 (see, for example, FIG. 3). Reference may again be had to FIG. 3. Each entry in the database may have a human-assigned compilation rating value for each topic category, which rank-orders (i.e. assigns a unique order value) expert site ratings. For example, a health site may provide outstanding information in the category of heart disease, and receive a top rating and/or order value. The same health site may, however, also provide limited and/or less outstanding information concerning stomach cancer. In such an event, the website would be highly rated and placed for heart disease, but less well rated and placed with respect to stomach cancer. By selecting individuals who are knowledgeable in their respective fields, a landscape of superior websites in those fields is constructed in the rating database. For example, individuals with knowledge pertaining to healthcare can construct all index of the most relevant and reliable healthcare websites. Thus, the invention identifies, evaluates, rates and ranks superior information at both a generic website level and a more granular level within websites.

As shown in FIG. 3, browser 200 includes toolbar 202 and expanded toolbar 306. Expanded toolbar 306 displays a list of results 302 which corresponds to the list of results 300 (shown in the main browser window). In the embodiment shown in FIG. 3, when the user clicks on a hyperlink in the list of results 302, a second browser window is opened and directed to the corresponding website. In some browsers, a second browser tab is opened, rather than a second browser window. In one such embodiment, the separate tab/window has a hyperlink which permits the user to return to the expanded toolbar and search at the point of origin. In such an embodiment, the user can view a website without losing the search that is currently underway. Proximal to the list of results 302, in one embodiment, is the numeric compilation rating value 304. This numeric rating value is also depicted graphically as graphic 305. In the embodiment depicted in FIG. 3, graphic 305 is a series of boxes in the form of a bar. The greater the rating value, the more boxes are colored. In the example shown in FIG. 3, the list of results includes search results such as "CNN.com—Health," the "Health News—New York Times," and the "Open Directory—Health," among others. When the rating database was queried for an entry corresponding to the first search result ("CNN.com—Health") that search result was found to have a rating value of 54.9. Likewise, the third search result (the "Open Directory—Health" webpage) was found to have a rating value of 46.5. When the query of the rating database was performed for the "Health News—New York Times" website no listing was found. In such an event, a null rating value is assigned. In the embodiment shown in FIG. 3, this is depicted as a "None" rating value. In another embodiment an alternative null rating is used. For example, a zero value may be used. Compilation rating value 304 is determined by examining a plurality of human-evaluated criteria, each of which is assigned a rating value by an individual. In the example of FIG. 3, numeric rating values are shown. In another embodiment, qualitative rating values are used. For example, qualitative rating values may include "poor," "good," "fair," "excellent," and the like. Often, when one performs a search, the list of results may contain multiple website URLs at a single domain location. The first such website is listed normally by the third-party search engine. The subsequent related or redundant websites are displayed as "indented" entries. In one embodiment of the invention, such indented entries are not evaluated/rated. Such un-rated entries are not listed in expanded toolbar 306.

Figure 4A:
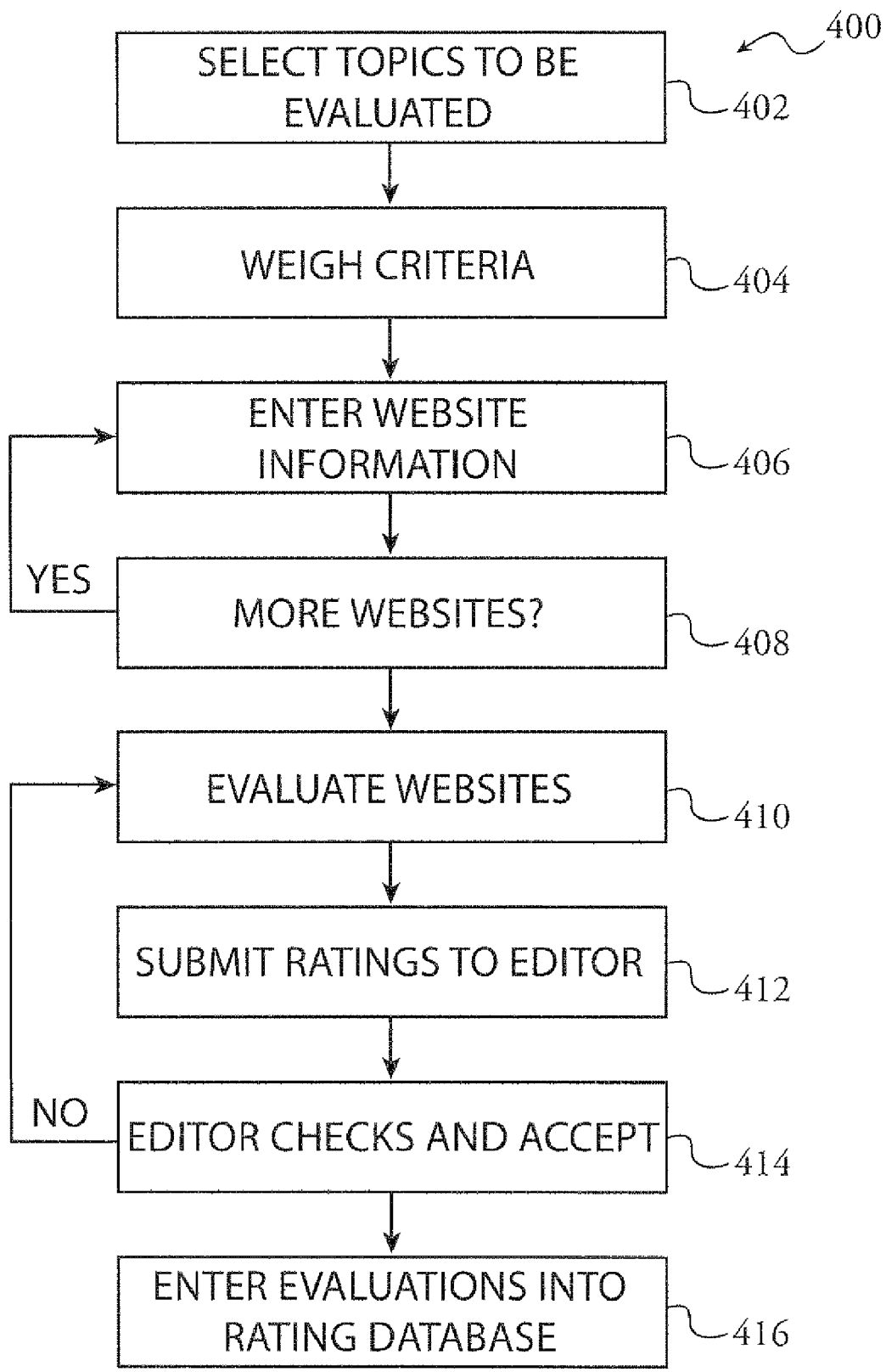
FIG. 4A is a flow diagram of a method for entering an evaluation into a rating database.

FIG. 4A is a depiction of method 400, wherein websites are rated according to certain criteria. In step 402 of method 400, topics are selected based upon the knowledge or expertise of the individual. For example, a given expert may have knowledge and/or experience in the areas of breast cancer and medical dictionaries. These two topics may be selected in step 402 to be evaluated by such an expert.

In step 404 of method 400, the weight for each criteria within each topic category is determined. In one embodiment, the criteria are weighed on a scale from 0 to 10 (10 being very important, 0 being immaterial). In one embodiment, the criteria includes matters such as scope, accuracy, currency (timeliness), richness, completeness, size of website, ease of navigation, searching/browsing capabilities, cross-linking (to both internal and external sites), output features (such as printing/saving screens), speed of loading, and privacy (spyware, required registration, and the like). It is noteworthy that the criteria is weighed on a per-topic category basis. For example, currency may be heavily weighed (value of 9 or 10, for example) for breast cancer websites, but the same currency criteria may receive a low weighing value for medical dictionaries (a value of 0 or 1, for example). Should an expert later add another website to a topic category that has already been entered (for example, a second breast cancer website) then the same breast cancer weighing values would be applied to both the first and second breast cancer websites. Advantageously, this helps reduce expert bias. A further advantage of method 400 is obtained by having the expert establish and weigh the criteria before the websites are rated. This further helps reduce expert bias. In one embodiment, an expert can add an expert-defined criteria to a specific topic category. For example, within the topic category of medical dictionaries, the expert may add a category such as etymology. Those dictionaries which provide the etymology of a medical term would receive a high rating value for such a criteria. In another embodiment, not shown, step 404 is determined after step 408.

In step 406, basic information is entered into an interface by the expert or the expert's surrogate. In one embodiment, the interface is a web-based interface which permits entry of data by the expert. Typical basic information includes the website URL, a website name, and the topic category to be associated with the website (see 602 of FIG. 6). For example, data may be entered for the website "wwwbreastcancer.com." Such a website may be associated with the topic category of "breast cancer." A second website may be entered for "www-.medicaldictionary.com." Such a website may be associated with the topic category of "dictionary" and a sub-category of "medical dictionary."

In step 408, a determination is made as to whether there are additional websites to be evaluated by the current expert. If there are more websites, then step 406 is repeated. Once all of the websites have been entered, step 410 is executed, wherein the websites are rated individually according to these criteria.

In step 410, each of the websites entered in step 406 are evaluated according to the criteria which are specific to their topic category. In one embodiment, the expert provides a numeric rating value, from 0 to 10, which indicates how the instant website performs for that criteria. In another embodiment, the rating value may be from 0 to 100. In addition to rating the website against each of the topic category-specific criteria the expert may, in some embodiments, also enter metadata which is to be associated with the web site. Such metadata may include, for example, a brief summary of the website, a detailed review of the website that may include commentary (requires cookies be enabled, weak privacy policy, requires special software, etc.), particular strengths of the websites, and particular weaknesses of the website. Once all of the websites have been evaluated with respect to all criteria, then step 412 is executed.

In step 412 the ratings are submitted to an editor. In one embodiment, such submissions are made over the internet. In step 414 the editor checks the submission for completeness and clarity. For example, if one of the criteria for "www.medicaldictionary.com" does not having a rating value, then such an omission would be detected in step 414. In such an event, the editor may return the submission to the expert and step 410 is repeated. In another embodiment, not shown, steps 412 and 414 are omitted. Once the editor has accepted the submission, then the evaluation is entered into the rating database (step 416).

Figure 4B:
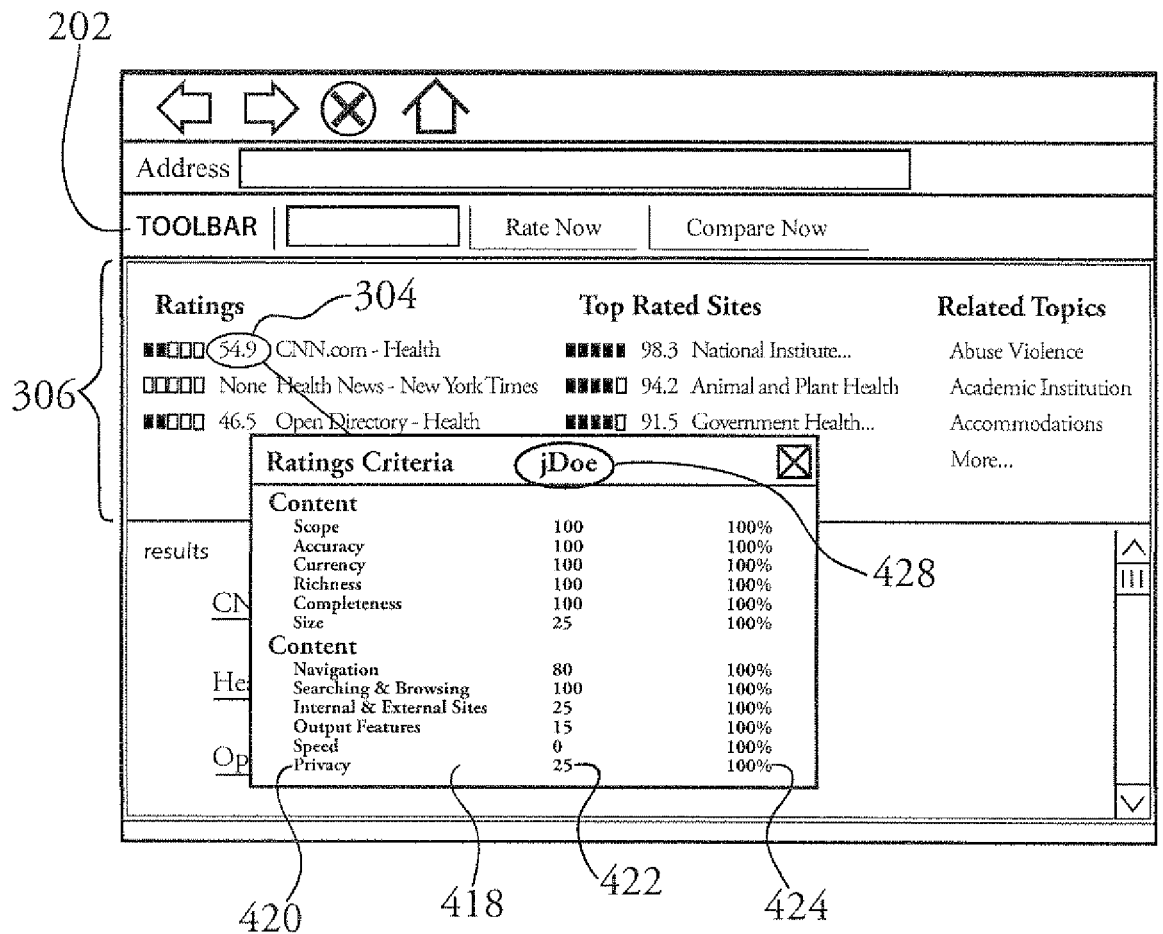
FIG. 4B shows a mouseover operation and the resulting pop-up box which lists certain criteria used in calculating one compilation rating value for the compared site.

Some examples of the human-evaluated criteria are shown in FIG. 4B. The criteria may be displayed by performing a mouseover of compilation rating value 304 in expanded toolbar 306. As known to those skilled in the art, a mouseover is a programmed behavior that causes a certain result only when the cursor is placed over a certain area of the screen. In one such event, a pop-up box 418 appears which contains the predetermined criteria. As shown in FIG. 4B, the website was rated by evaluating both content criteria and access criteria. Content criteria includes matters such as scope, accuracy, currency (timeliness), richness, completeness, and size of website. Access criteria includes matters such as ease of navigation, searching/browsing capabilities, cross-linking (to both internal and external sites), output features (such as printing/saving screens), speed of loading, privacy (spyware, required registration, and the like). Such criteria are listed in area 420 of FIG. 4B, The expert identifier 428 is also shown, which permits the submitter to identify the expert who rated the site. In area 422, the rating value that the expert assigned to each of the criteria listed in area 420 is given. In area 424, a percentage of users who agreed with the expert is given. Such users may be, for example, the submitters of search terms. These user votes may differ from the expert's rating values. Experts may choose to revise their ratings according to these user votes. In one embodiment, the expert can add an expert defined criteria. Experts may enter rating values and metadata into the rating database using, for example, a web-based interface.

Figure 4C:
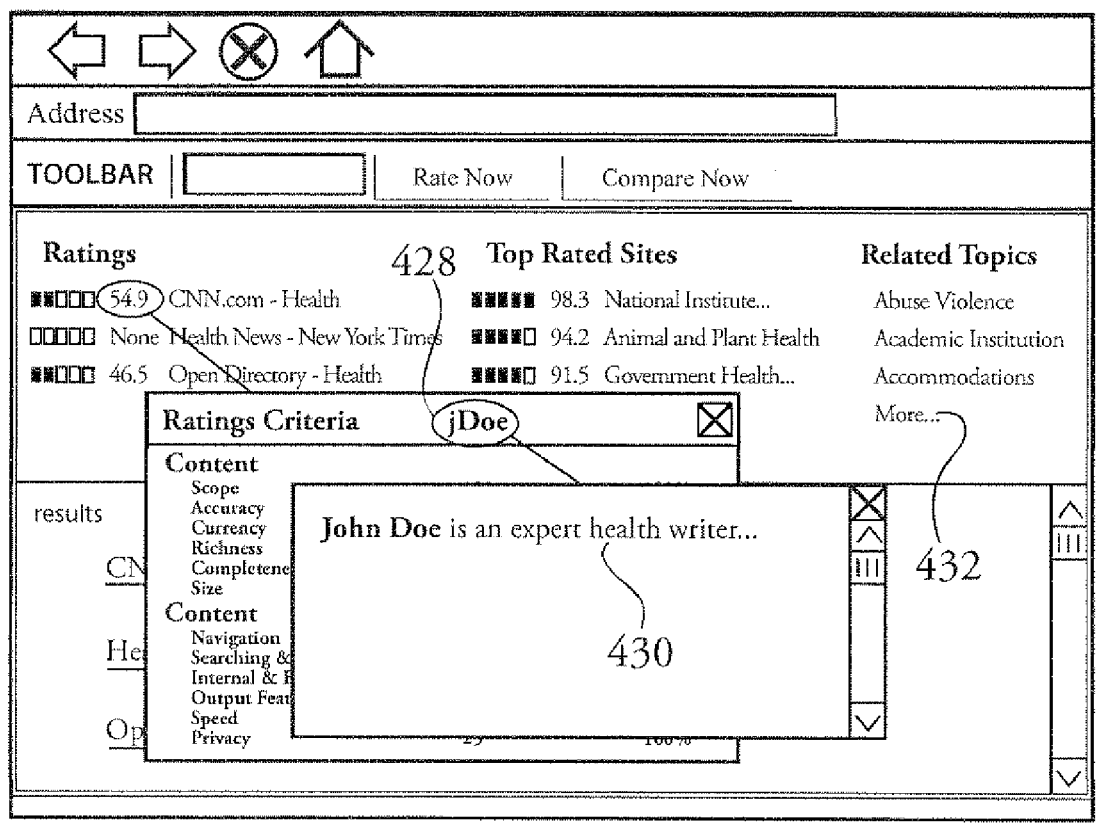
FIG. 4C depicts a mouseover operation and the resulting pop-up box for one embodiment of the invention.

In one embodiment, shown in FIG. 4C, when one performs a mouseover operation over expert identifier 428, a pop-up box 430 appears. Pop-up box 430 contains information pertaining to the expert who determined the rating values shown in FIG. 4B (see pop-up box 418). For example, the expert's academic credentials may be listed. This permits search term submitters to determine whether or not they should rely upon the expert's evaluations.

In one embodiment, the rating values cannot be altered by the submitter of the search term. Such a configuration maintains the integrity of the rating database and ensures only the authorized experts are able to assign rating values and enter metadata. It is noteworthy that the rating values are assigned by human experts, and are not assigned by a computer algorithm. In one embodiment, the rating values (which are assigned by human experts) are compiled by a computer algorithm into a compilation rating value. As previously described, the expert assigned rating values may be weighed such that some criteria contribute more to the calculation of the compilation rating value. For example, when searching for information pertaining to dictionaries, timeliness criteria may be of little importance. In contrast, when searching for information concerning weather reports, timeliness may be considered critical.

Figure 5:
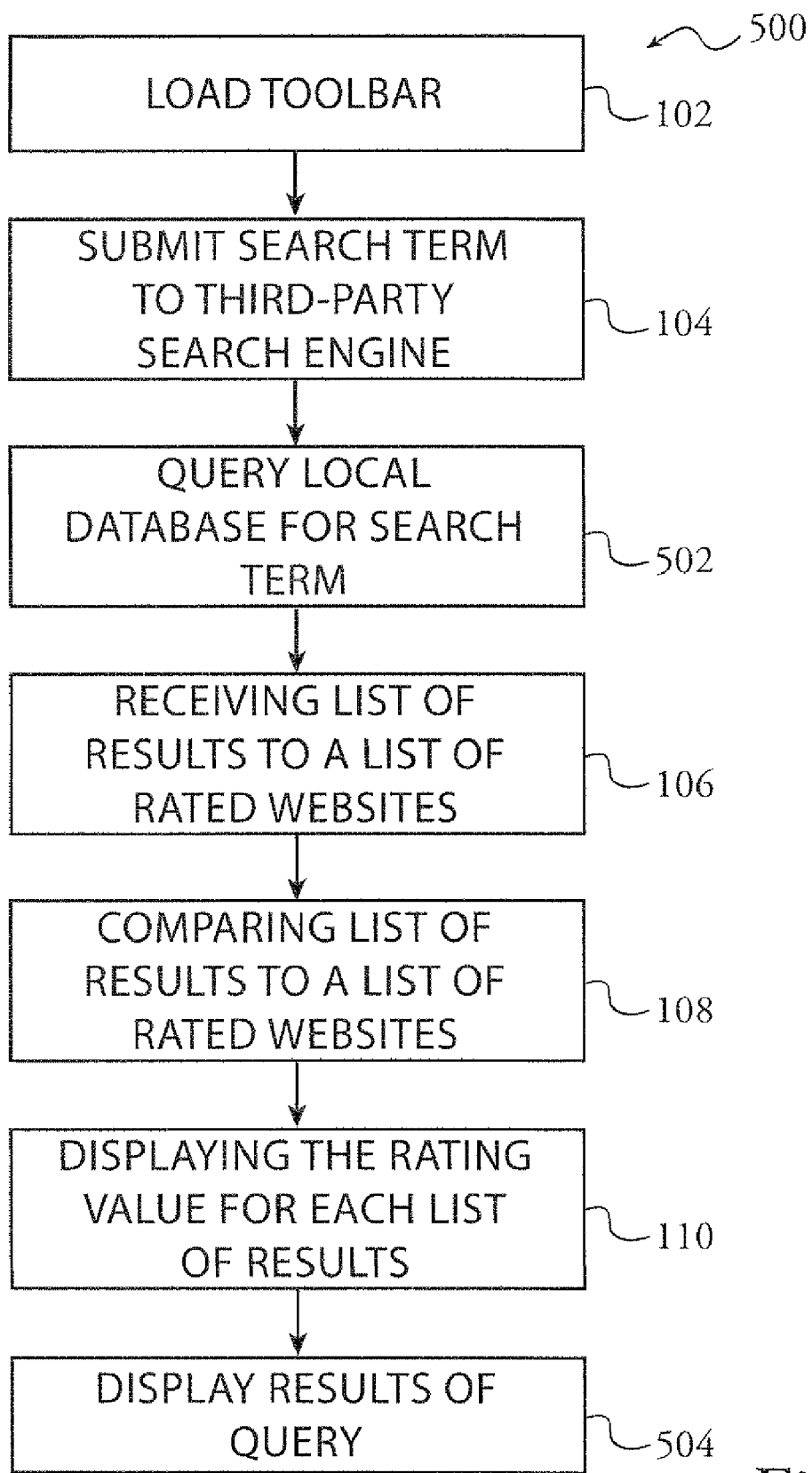
FIG. 5 is another flow diagram showing another method of the invention.
Figure 6:
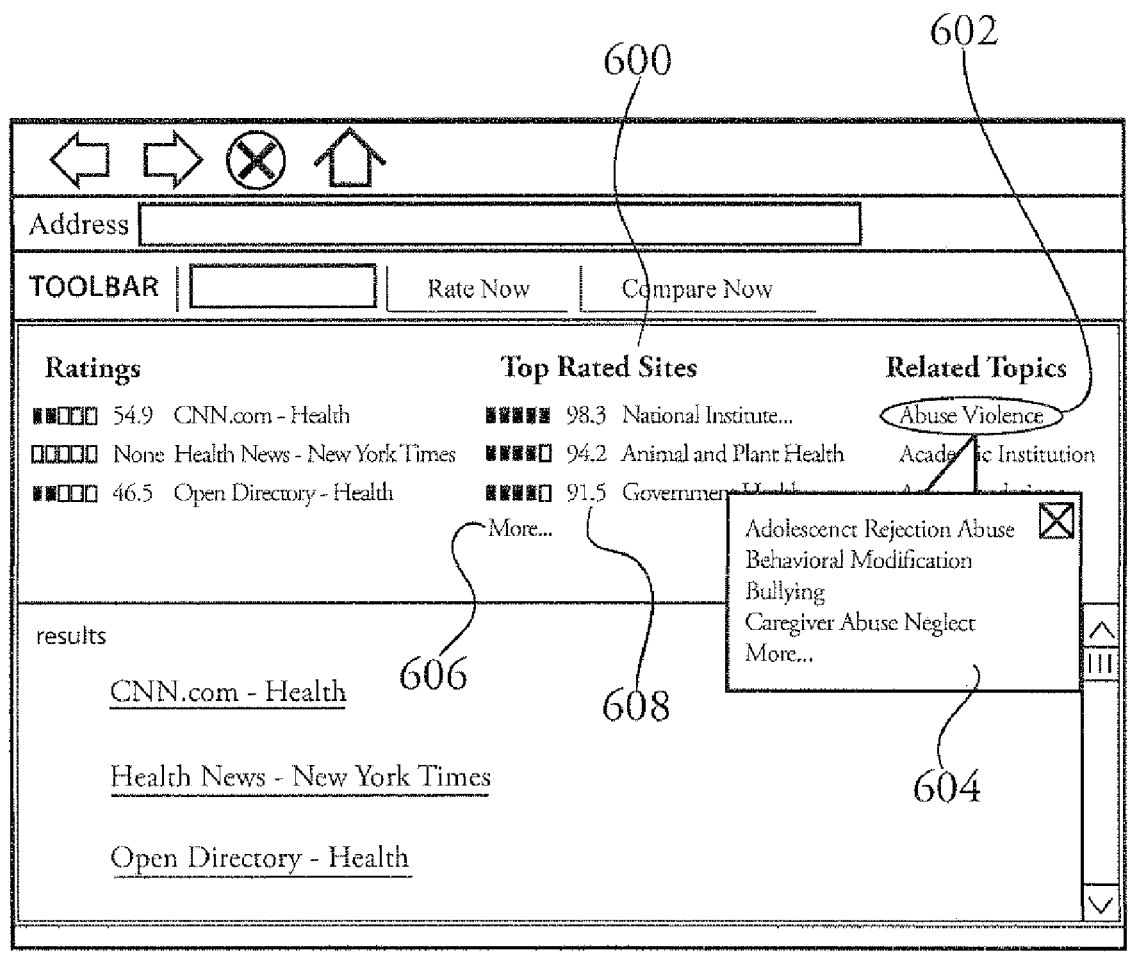
FIG. 6 is similar to FIG. 4C, except in that a different pop-up box is displayed when a different mouseover operation is preformed.

Referring now to FIG. 5 (depicting the method 500) and FIG. 6 (depicting the output of method 500), method 500 is depicted which is similar to method 100 of FIG. 1, but wherein additional steps 502 and 504 are included. In method 100, steps 102 and 104 are executed as described in method 100 (see FIG. 1). Method 500 differs from method 100 in that, in step 502, the search term which was submitted to the third-party search engine is also submitted as a search term to the rating database which contained the rating values. In the instant example, the rating database is further comprised of searchable metadata which pertains to each of the website entries. In this manner, the rating database may be queried for search terms much like the third-party search engine queries its database. The rating database need not be constructed as a single table. A relational database may be used. Once step 502 has been executed, steps 106, 108, and 110 are executed as described in method 100. Additionally, step 504 displays the results of the query of the rating database (step 502). Such results may include, for example, "hits" (i.e. top rated websites based on the search term) and suggested topic categories for a broader, expanded search. The results of step 504 are best depicted in FIG. 6.

FIG. 6 is a depiction of browser 200 which, in one embodiment, shows the results of the query that was performed in step 504 (see FIG. 5). In FIG. 6, the results include listing 600, which is a rank-ordered list of "hits" that resulted from querying the ratings database with the search term. A rank-order (e.g. order value 608) for the rated sites may then be established by evaluating the compilation rating values for each website. The list 600 presents the most relevant results at the top of the list. In the embodiment shown in FIG. 6, when the user clicks on a hyperlink in listing 600 (which includes order value 608), a second browser window is opened and directed to the corresponding website. In some browsers, a second browser tab is opened, rather than a second browser window. In the embodiment depicted in FIG. 6, only the top four hits are displayed. Additional hits may be displayed by activating hyperlink 606. When the user clicks on a hyperlink 606, a second browser window is opened and directed to the corresponding website. In some browsers, a second browser tab is opened, rather than a second browser window. In one such embodiment, the separate tab/window has a hyperlink which permits the user to return to the expanded toolbar and search at the point of origin. In such an embodiment, the user can view a website without losing the search and expanded toolbar display that is currently underway. Additionally, in another embodiment, the results include suggested topic categories 602. Such topic categories were determined by comparing the search term to a database that correlates such search terms to various topic categories. For example, when the search term is "health" the suggested topic categories include "Abuse Violence," "Academic Institution," "Accommodations" and the like. Four such topic categories are shown in the Figure. Additional topic categories may be displayed by activating hyperlink 432 (see FIG. 4C). When the user clicks on a hyperlink 432 a second browser window is opened and directed to the corresponding website. In some browsers, a second browser tab is opened, rather than a second browser window. In one such embodiment, the separate tab/window has a hyperlink which permits the user to return to the expanded toolbar and search at the point of origin. In such an embodiment, the user can view a website without losing the search that is currently underway. In the embodiment depicted in FIG. 6, if one performs a mouseover operation on the topic category 602, a pop-up box 604 appears which provides a list of sub-categories.

Figure 7:
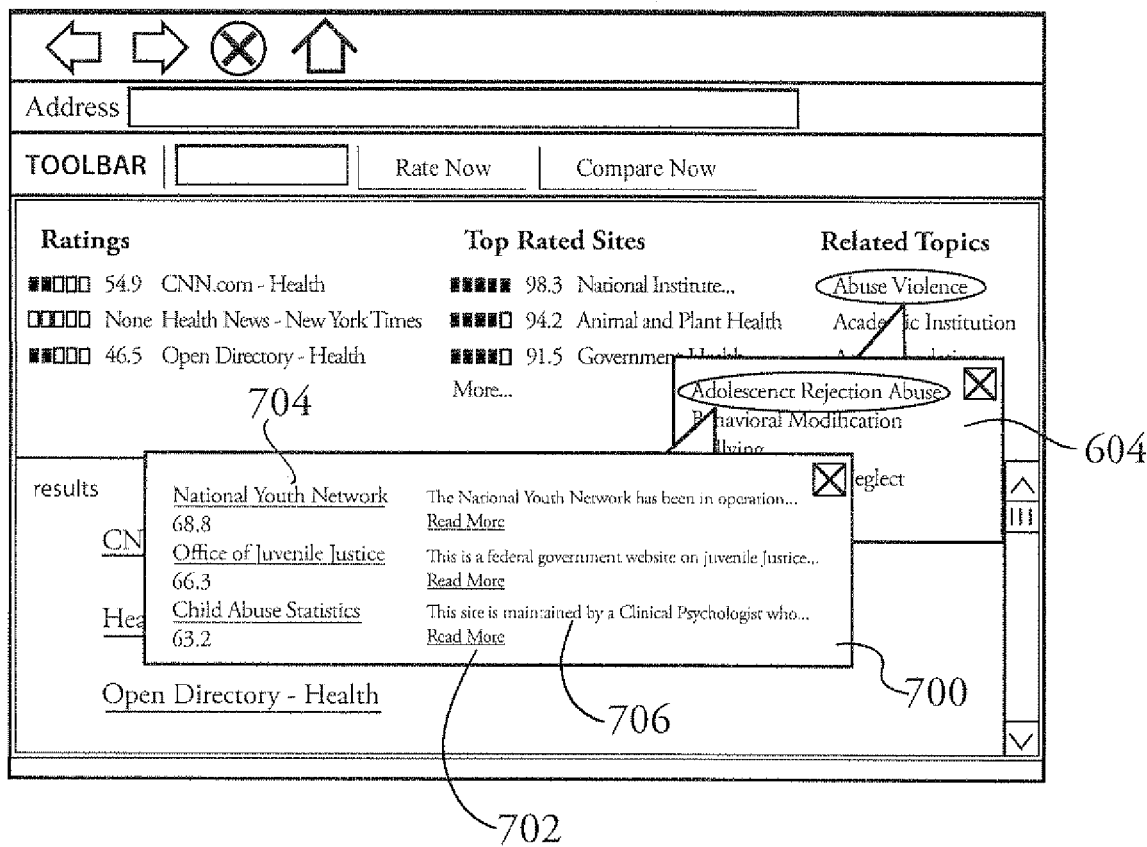
FIG. 7 illustrates a secondary pop-up box display.

As shown in FIG. 7, if one performs a mouseover of a sub-category within primary pop-up box 604, a secondary pop-up box 700 appears. Pop-up box 700 contains hyperlinks 704 to ranked URLs with top rating values that fall within the category and sub-category. In the embodiment shown in FIG. 7, when the user clicks on a hyperlinks 704, a second browser window is opened and directed to the corresponding website. In some browsers, a second browser tab is opened, rather than a second browser window. In one such embodiment, the separate tab/window has a hyperlink which permits the user to return to the expanded toolbar and search at the point of origin. In such an embodiment, the user can view a website without losing the search and expanded toolbar display that is currently underway. Detailed reviews (stored as metadata in the rating database) for each of these URLs may be accessed by selecting hyperlink 702. As discussed above, a separate tab/window may be used to enable the user to view a review without losing the search and expanded toolbar display that is currently underway. Brief summaries 706 for each of the hyperlinks 704 are displayed in pop-up box 700. Although only one (primary) category box 604 and one (secondary) sub-category box 700 are shown in FIG. 7, it should be appreciated that any number of sub-category boxes may appear, depending upon how finely divided a given category/sub-category may be. For example, a tertiary or quaternary pop-up box may be used. In one embodiment, each of these pop-up boxes is activated by a mouseover event. In another embodiment, not shown, clicking on "More" creates a customized directory/index of related topics for an expanded navigational menu as a search guide. Such a guide is based upon the search term received by the toolbar.

Figure 8A:
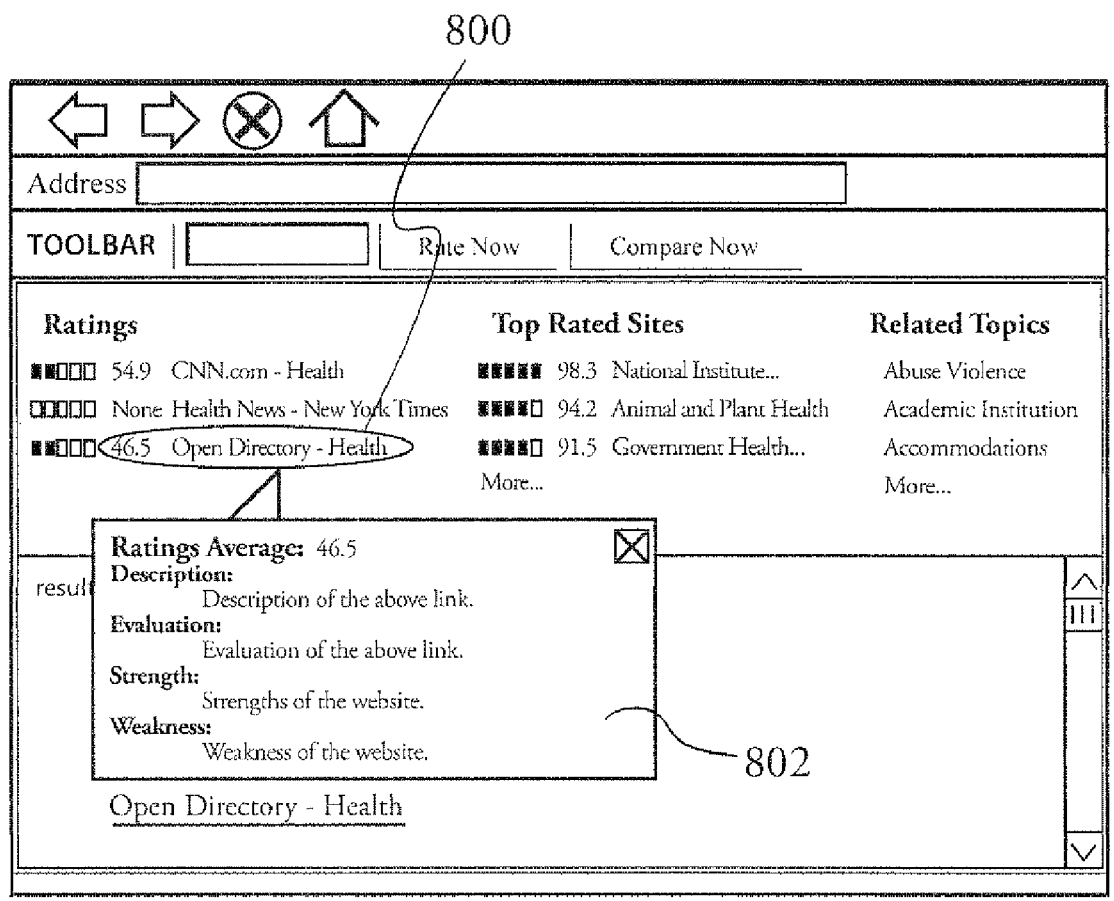
FIG. 8A shows metadata being displayed for a certain search result.

Another mouseover event is depicted in FIG. 8A. When a user performs a mouseover on title 800, a metadata pop-up box 802 appears which contains a detailed review of the corresponding website similar to the review discussed in FIG. 4A (see step 410) and FIG. 7. Such reports may detail, for example, the website's strengths, weaknesses, the compiled rating value, and the like. In another embodiment, such a report appears as a separate window, rather than in a pop-up box. In one such embodiment, the separate window has a hyperlink which permits the user to return the expanded toolbar and search at the point of origin. In such an embodiment, the user can view a website's detailed report without losing the search and expanded toolbar display that is currently underway.

Figure 8B:
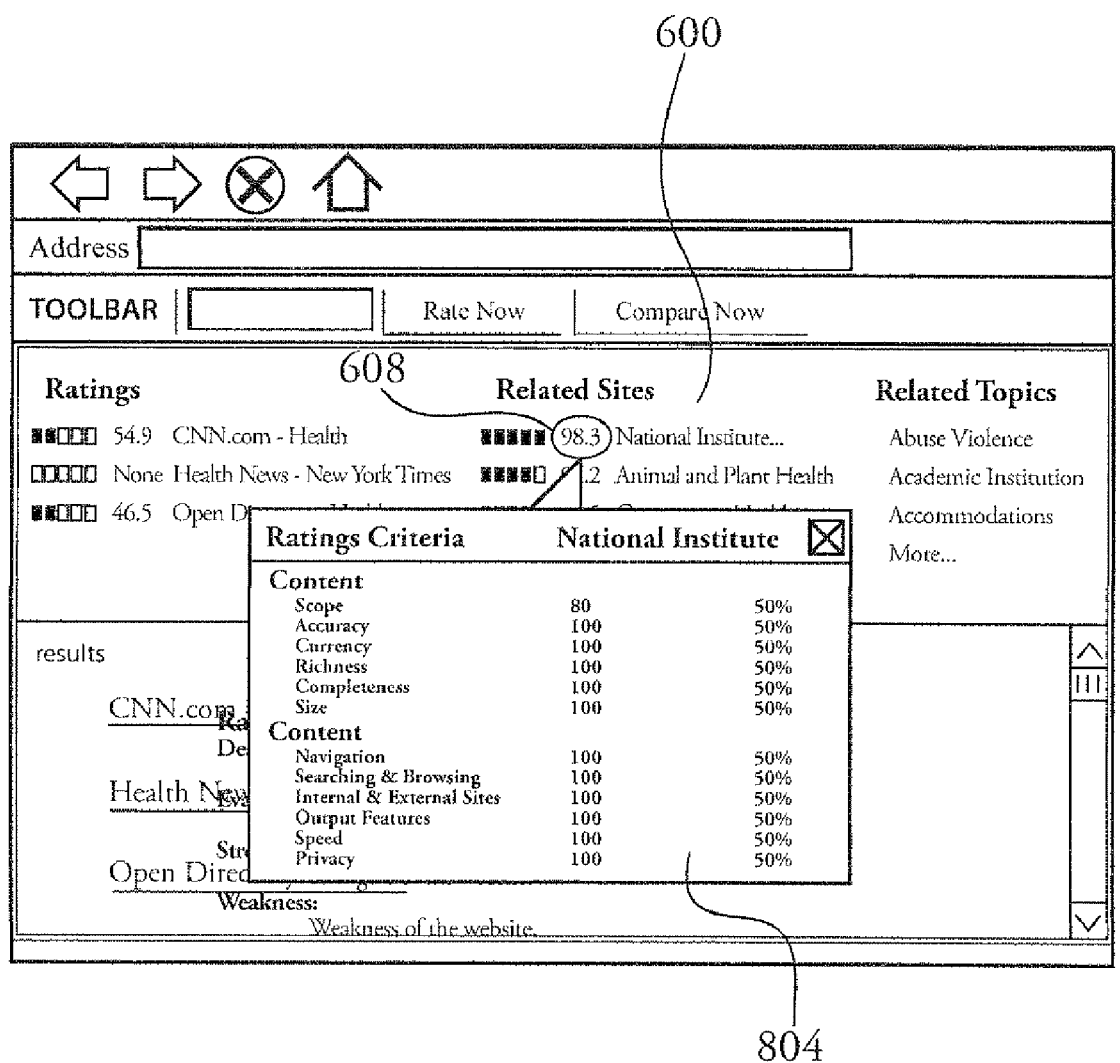
FIG. 8B depicts another mouseover operation that produces another pop-up box for use with the instant invention.

Yet another mouseover event is shown in FIG. 8B. When one performs a mouseover operation on the order value 608 in list 600 (see FIGS. 6 and 8B), pop-up box 804 appears. The content of pop-up box 804 is similar to that of pop-up box 418 (see FIG. 4B), but differs with respect to the order value 608 in listing 600, which is a list of top "hits" that resulted from querying the ratings database. Since only a select group of websites appear in the ratings database, queries of that database are more likely to produce reliable, relevant results.

Figure 9:
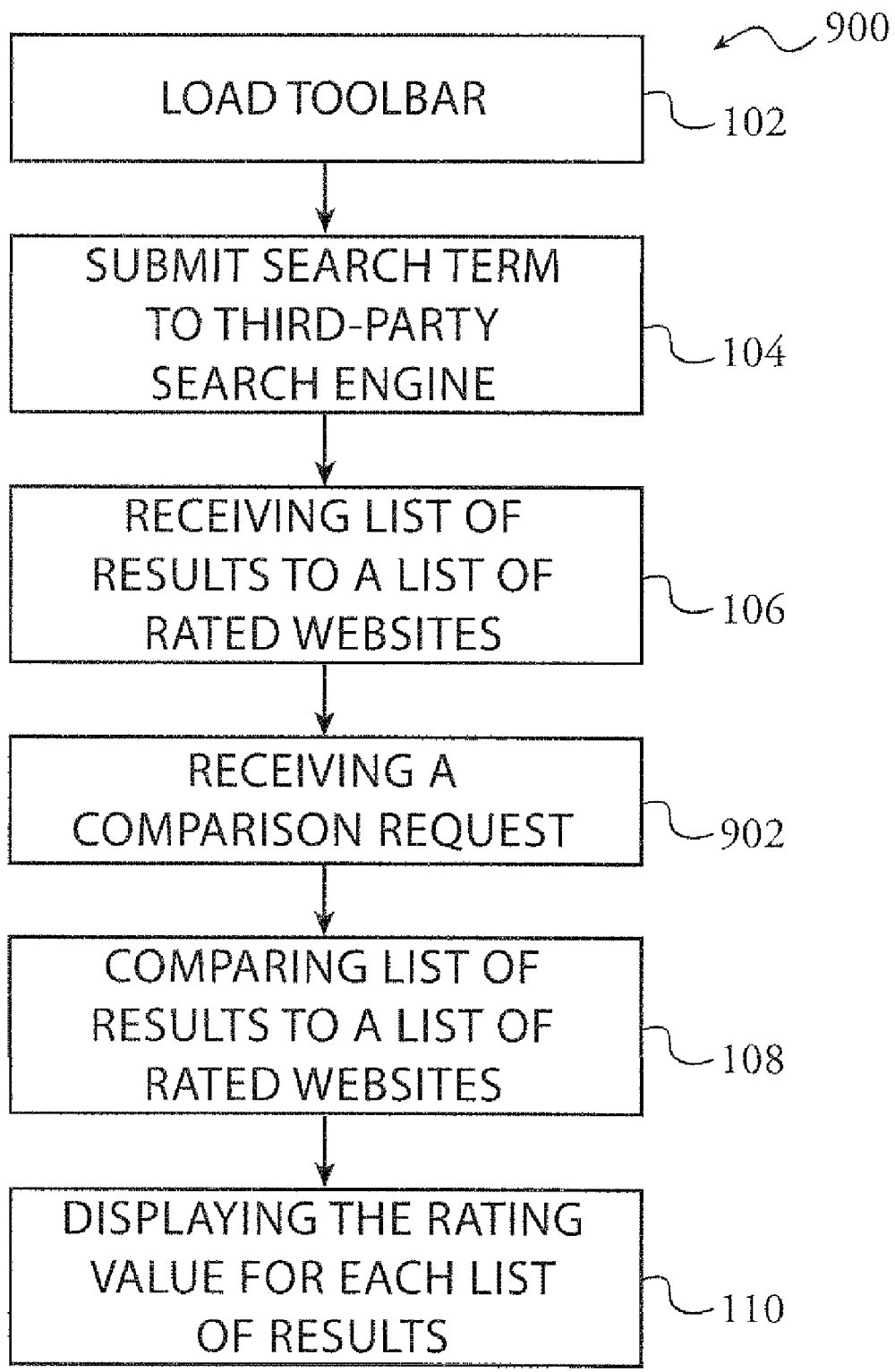
FIG. 9 is another flow diagram of another method for use with the instant invention.
Figure 10:
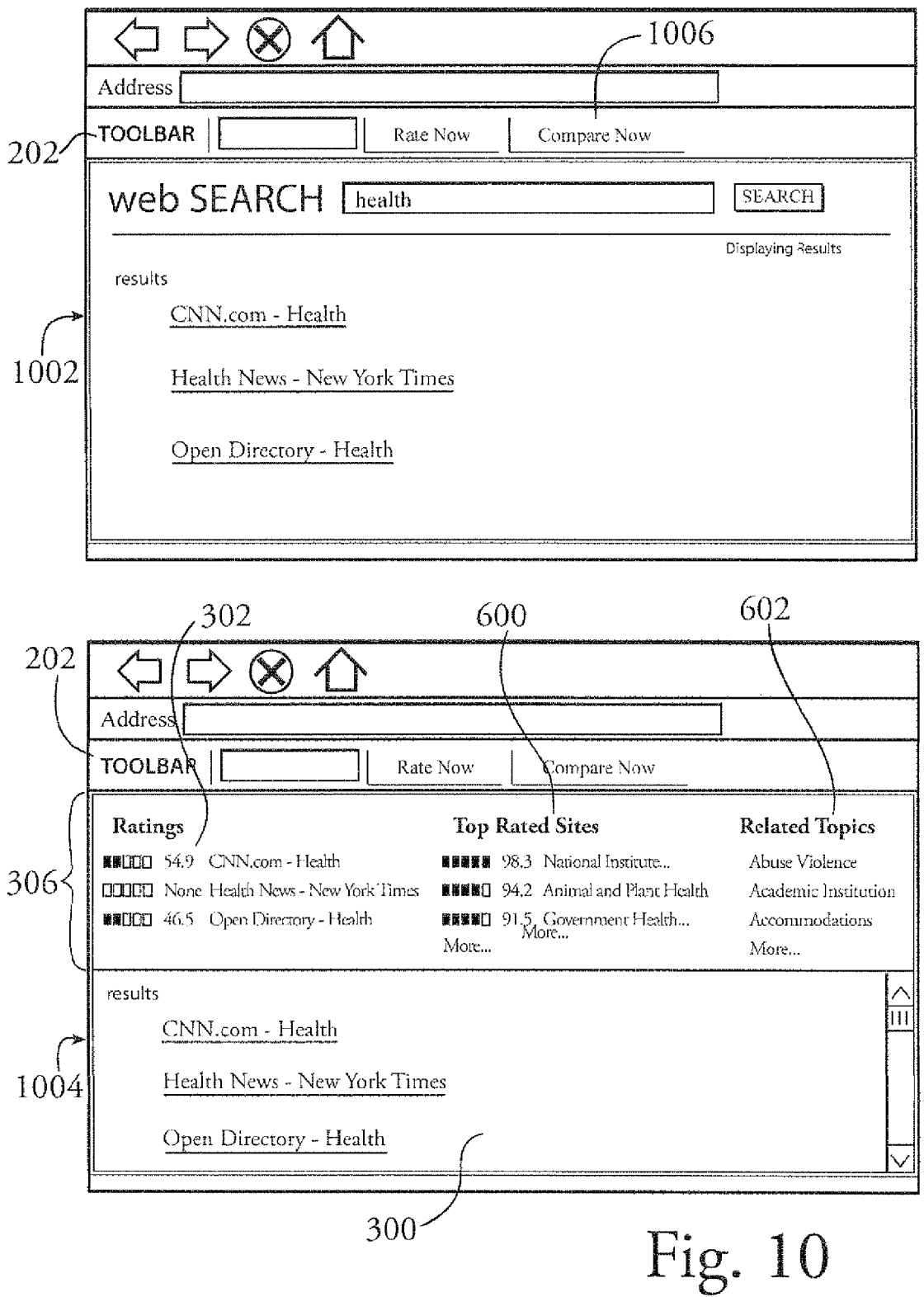
FIG. 10 depicts a toolbar in a collapsed and in an expanded state.

FIG. 9 depicts method 900 which is similar to method 100 (see FIG. 1) except in that step 902 has been added. Method 900 is initiated by the execution of steps 102, 104, and 106, as described in method 100. In step 902, the toolbar application receives a user request for a comparison of the list of results to the list of rated websites. In the embodiment depicted in FIG. 9, steps 108 (comparing the results to the rated website list) and 110 (displaying the results) are performed only if a request was made in step 902. Advantageously, this frees system resources in the event that no such comparison is desired. FIG. 10 illustrates one method for making such a request.

FIG. 10 is a depiction of window 1002 (before the request of step 902 is made) and window 1004 (after such a request is made). In window 1002, toolbar 202 includes request button 1006. Upon activation of request button 1006, toolbar 202 expands to display expanded toolbar 306. In one embodiments request button 1006 functions as a toggle, both expanding toolbar 202 into expanded toolbar 306 and the reverse operation. Window 1004 shows the expanded toolbar 306. When expanded toolbar 306 is visible in one embodiment, three block of data are presented to the viewer. The first such block is the list of the results 302 which provides the viewer with the compilation rating value for each website listed in the list of results 300. The second such block is the rank-ordered listing 600 which is the result of querying the metadata in the rating database with the search term. The second block presents the list of websites in rank-order based upon the websites order value. The third such block lists topic categories 602, wherein several topic categories are suggested to the viewer, based on the submitted search term.

Figure 11:
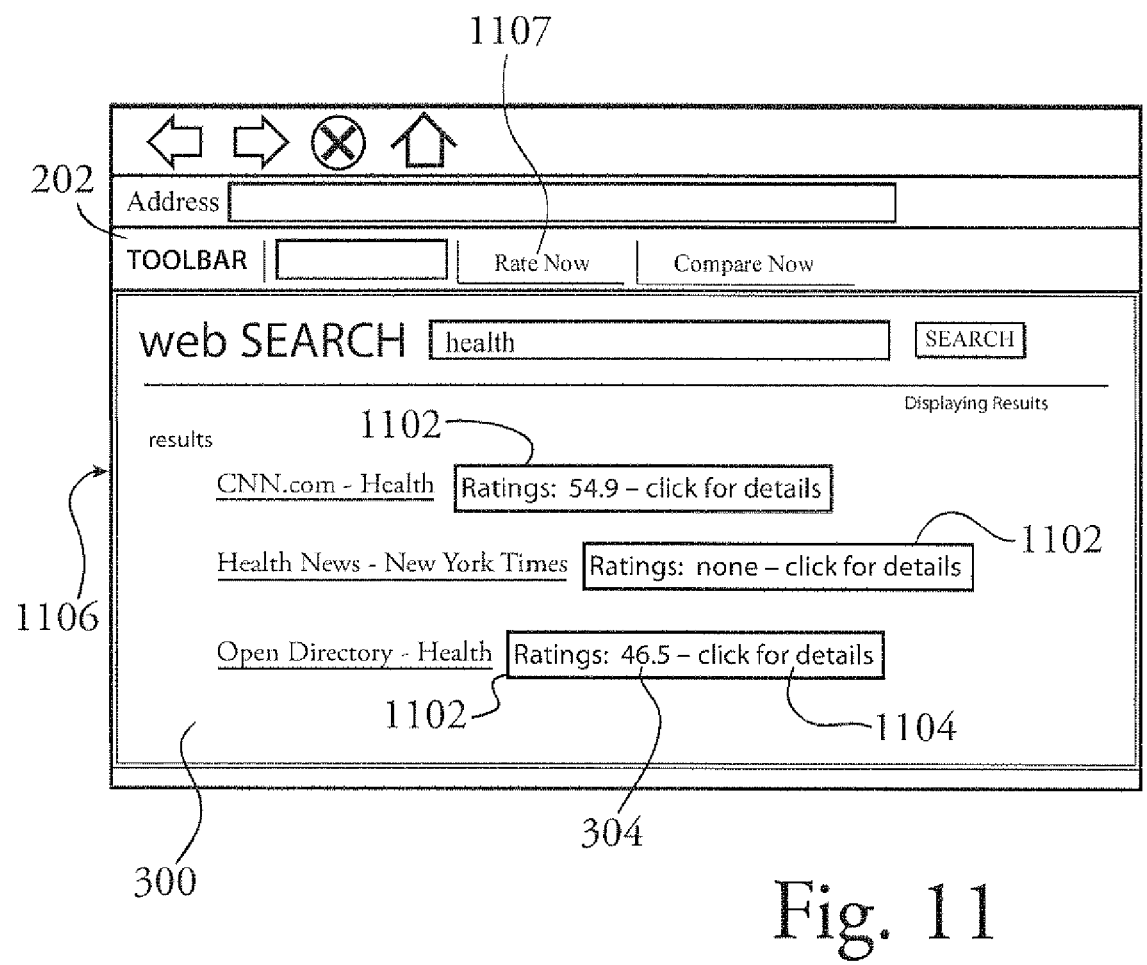
FIG. 11 is another embodiment of the invention that does not use an expanded toolbar.

FIG. 11 is a depiction of another embodiment of the invention which does not utilize an expanded toolbar. In the embodiment depicted in FIG. 11, toolbar 202 is comprised of request button 1107. In the embodiment depicted in FIG. 11, request button 1107 functions as a toggle, which causes the rating display box 1102 to appear and/or disappear. In this manner, rating display box 1102 is overlaid atop window 1106 such that each rating display box 1102 is proximal to a corresponding result in the list of results 300. Displayed within rating display box 1102 is compilation rating value 304 and hyperlink 1104. Hyperlink 1104 opens a separate tab/window which contains a detailed review, such as the detailed review discussed in FIG. 8A or depicted in subcategory box 700. As discussed elsewhere in this specification, such a tab/window configuration permits the user to view a website without losing the search that is currently underway.

While the invention has been described with reference to preferred embodiments, it will be understood by those skilled in the art that various changes may be made and equivalents may be substituted for elements thereof to adapt to particular situations without departing from the scope and spirit of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A program storage device readable by machine, tangibly embodying a program of instructions executable by machine to perform the method steps for enhancing search results comprising the steps of:

identifying a third-party search engine from a plurality of search engines;

loading a communication protocol that is selected from a plurality of communication protocols, wherein the selected communication protocol is selected to properly interpret the communication from the identified third-party search engine;

receiving a list of results from the third-party internet search engine in a first rank order in response to a submission of a search term to the search engine, comparing the list of results to a list of websites in a database, wherein the database includes a rating value for each website in the list of websites in the database, determining the rating value for each result in the list of results which was found in the list of websites in the database, wherein the rating value was determined by an evaluator that evaluates a plurality of predetermined criteria, the criteria being weighed such that not all criteria contribute equally to the determination of the rating value, such weighing being established by the evaluator of the website and the same criteria weighing being applied to all websites evaluated by the evaluator who determined the rating value, assigning a null value to the rating value for each result in the list of results which was not found in the list of websites in the database, displaying the rating value for each result while maintaining the first rank order that was established by the third-party search engine.

2. The program storage device as recited in claim 1, wherein the search term is submitted to the third-party internet search engine through a web browser.

3. The program storage device as recited in claim 2, wherein the rating value is displayed in a toolbar integrated with the web browser.

4. The program storage device as recited in claim 3, wherein the toolbar is comprised of a request button, which toggles the appearance of an expanded toolbar.

5. The program storage device as recited in claim 1, wherein the rating value is displayed in a rating display box.

6. The program storage device as recited in claim 1, wherein the rating value is a numeric rating value.

7. The program storage device as recited in claim 1, wherein the rating value is depicted graphically.

8. The program storage device as recited in claim 1, wherein the search engine is hosted on a first server and the database is hosted on a second server.

9. The program storage device as recited in claim 1, wherein the database includes metadata for at least one website in the database.

10. The program storage device as recited in claim 9, wherein the metadata includes a topic category for at least one website in the database.

11. The program storage device as recited in claim 9, wherein the method further comprises the step of comparing the search term to the metadata, thus producing a list of related web sites.

12. A program storage device readable by machine, tangibly embodying a program of instructions in the form of an internet browser application executable by machine to perform the method steps for enhancing search results comprising the steps of identifying a third-party search engine from a plurality of search engines;

loading a communication protocol that is selected from a plurality of communication protocols, wherein the selected communication protocol is selected to properly interpret the communication from the identified third-party search engine;

receiving a list of results from the third-party search engine, comparing the list of results to a list of websites in a database, wherein the database includes a rating value for each website in the database, determining the rating value for each result in the list of results which was found in the list of websites in the database, wherein the rating value is determined by evaluating a plurality of predetermined criteria, the criteria being weighed such that not all criteria contribute equally to the determination of the rating value, such weighing being established by an evaluator of the website and the same criteria weighing being applied to all websites evaluated by the evaluator who determined the rating value, assigning a null value to the rating value for each result in the list of results which was not found in the list of websites in the database, displaying the rating value for at least one result in the list of results in a rating display box of the browser such that the rating value is displayed proximal to the at least one result without changing the rank order of the list of results from the third-party search engine.

13. The program storage device as recited in claim 12, wherein the rating value is determined by evaluating the criteria which are not assigned by a computer algorithm.

14. The program storage device as recited in claim 12, wherein the database includes metadata for at least one website in the database.

15. The program storage device as recited in claim 14, wherein the method further comprises the step of comparing a search term that was submitted to the search engine to the metadata, thus producing a list of related websites.

16. The program storage device as recited in claim 15, wherein the method further comprises the step of determining an order value for each website in the list of the related websites which was found in the database.

17. The program storage device as recited in claim 12, wherein the database includes a topic category for at least one website in the database.

18. The program storage device as recited in claim 12, wherein the list of results was received from the third-party search engine in response to the submission of a search term by a submitter, wherein the submitter cannot alter the rating value.

19. A method for enhancing search results comprising the steps of:

selecting, from a plurality of individuals, at least one individual to serve as an evaluator, weighing a plurality of predetermined criteria, by each evaluator, such that at least one of the plurality of predetermined criteria contributes more to the determination of a compilation rating value than the other plurality of predetermined criteria, thus producing a weighed plurality of predetermined criteria, providing an opportunity for each individual evaluator to evaluate a plurality of internet websites according to the weighed plurality of predetermined criteria established by each individual evaluator, providing an opportunity for the evaluator to rate at least one of the plurality of internet websites based on the weighed plurality of predetermined criteria, thus producing a weighed criteria rating value for each of the weighed plurality of predetermined criteria, wherein the individuals who are not selected to serve as an evaluator are not permitted to rate the websites, storing the weighed criteria rating value in a rating database, the rating database being hosted on a computer, determining the compilation rating value for each website in the plurality of internet websites based upon the weighed criteria rating values, storing the compilation rating values in the rating database such that web compilation rating value is correlated to each website in the plurality of internet websites, receiving a list of results from a third-party internet search engine in a first rank order in response to a submission of a search term to the search engine, comparing the list of results to the plurality of websites in the database, assigning a null value to the compilation rating value for each result in the list of results which was not found in the list of websites, display the list of results from the third-party search engine while maintaining the first rank order that was established by the third-party search engine, displaying the compilation rating value for each result.

20. The method as recited in claim 19, further comprising the step of providing an opportunity for a submitter of the search term to provide input concerning the compilation rating value, wherein the input is selected from the group consisting of agreeing and disagreeing with the compilation rating value, wherein the submitter cannot change the compilation rating value.

21. A program storage device readable by machine, tangibly embodying a program of instructions in the form of an internet browser application executable by machine to perform the method steps for enhancing search results comprising the steps of a. receiving a list of results from a third-party search engine in a first rank order, b. comparing the list of results to a list of websites in a database, wherein the database includes a rating value for each website in the database, c. determining the rating value for each result in the list of results which was found in the list of websites in the database, wherein the rating value is determined by evaluating a plurality of predetermined criteria wherein the plurality of predetermined criteria are weighed such that not all criteria contribute equally to the determination of the rating value, such weighing being established by an evaluator of the website and the same criteria weighing being applied to all websites evaluated by the evaluator who determined the rating value, d. assigning a null value to the rating value for each result in the list of results which was not found in the list of websites in the database, e. displaying the rating value for at least one result in the list of results in a toolbar of the browser while maintaining the first rank order that was established by the third-party search engine.

22. The program storage device as recited in claim 21, wherein the method further comprises the step of displaying the list of related websites in the toolbar of the browser, ordered by the order value.

* * * * *